United States Patent
Cheng et al.

(10) Patent No.: US 12,197,367 B2
(45) Date of Patent: *Jan. 14, 2025

(54) COMMUNICATIONS FOR FIELD PROGRAMMABLE GATE ARRAY DEVICE

(71) Applicant: Microsoft Technology Licensing, LLC, Redmond, WA (US)

(72) Inventors: Peng Cheng, Redmond, WA (US); Ran Shu, Redmond, WA (US); Guo Chen, Redmond, WA (US); Yongqiang Xiong, Redmond, WA (US); Jiansong Zhang, Redmond, WA (US); Ningyi Xu, Redmond, WA (US); Thomas Moscibroda, Redmond, WA (US)

(73) Assignee: Microsoft Technology Licensing, LLC

( * ) Notice: Subject to any disclaimer, the term of this patent is extended or adjusted under 35 U.S.C. 154(b) by 0 days.

This patent is subject to a terminal disclaimer.

(21) Appl. No.: 18/344,165

(22) Filed: Jun. 29, 2023

(65) Prior Publication Data

US 2023/0350825 A1    Nov. 2, 2023

Related U.S. Application Data

(63) Continuation of application No. 17/560,524, filed on Dec. 23, 2021, now Pat. No. 11,726,938, which is a continuation of application No. 16/615,053, filed as application No. PCT/US2018/028981 on Apr. 24, 2018, now Pat. No. 11,243,901.

(30) Foreign Application Priority Data

May 24, 2017    (CN) .......................... 201710375581.0

(51) Int. Cl.
G06F 13/38    (2006.01)
G06F 13/12    (2006.01)
(Continued)

(52) U.S. Cl.
CPC .......... *G06F 13/382* (2013.01); *G06F 13/126* (2013.01); *G06F 21/76* (2013.01); *H04L 65/1069* (2013.01); *H04L 69/12* (2013.01)

(58) Field of Classification Search
CPC ...... G06F 13/382; G06F 13/126; G06F 21/76; G06F 13/16; H04L 65/1069; H04L 69/12; H04L 69/06; H04L 69/08
(Continued)

(56) References Cited

U.S. PATENT DOCUMENTS 7,636,355 B2 * 12/2009 Koistinen ............. H04L 69/161
                                                    370/392
9,137,116 B1 *  9/2015 Rijsman ................. H04L 67/10
(Continued)

*Primary Examiner* — Idriss N Alrobaye
*Assistant Examiner* — Henry W Yu

(57) ABSTRACT

According to implementations of the subject matter described herein, there is proposed a solution for supporting communications for an FPGA device. In an implementation, the FPGA device includes an application module and protocol stack modules. The protocol stack modules are operable to access target devices based on different communication protocols via a physical interface. The FPGA device further includes a universal access module operable to receive, from the application module, first data and a first identity of a first target device, the first target device acting as a destination of the first data, and transmit, based on the first identity and predetermined first routing information, the first data to a first protocol stack module accessible to the first target device via the physical interface. By introducing the universal access module, it is possible to provide unified and direct communications for the application module.

20 Claims, 7 Drawing Sheets

(51) Int. Cl.
  *G06F 13/16* (2006.01)
  *G06F 21/76* (2013.01)
  *H04L 65/1069* (2022.01)
  *H04L 69/06* (2022.01)
  *H04L 69/08* (2022.01)
  *H04L 69/12* (2022.01)

(58) Field of Classification Search
  USPC .................. 710/2, 31, 33, 38, 105, 316
  See application file for complete search history.

(56) References Cited

U.S. PATENT DOCUMENTS

| | | | | |
|---|---|---|---|---|
| 2003/0225724 | A1* | 12/2003 | Weber | H04L 49/35 |
| 2008/0117910 | A1* | 5/2008 | Page | H04L 49/3009 |
| | | | | 370/392 |
| 2010/0070650 | A1* | 3/2010 | MacGaffey | H04L 69/16 |
| | | | | 709/238 |
| 2013/0070745 | A1* | 3/2013 | Nixon | H04W 84/02 |
| | | | | 370/328 |
| 2013/0077773 | A1* | 3/2013 | Clark | H04L 63/0428 |
| | | | | 379/88.22 |
| 2015/0103838 | A1* | 4/2015 | Zhang | H04L 12/467 |
| | | | | 370/401 |
| 2015/0254088 | A1* | 9/2015 | Chou | H04L 67/1097 |
| | | | | 718/1 |
| 2018/0313889 | A1* | 11/2018 | Su | G01R 31/2806 |

* cited by examiner

COMMUNICATIONS FOR FIELD PROGRAMMABLE GATE ARRAY DEVICE

CROSS REFERENCE TO RELATED APPLICATIONS

This application is a Continuation of U.S. application Ser. No. 17/560,524 filed Dec. 23, 2021 which is a Continuation of U.S. application Ser. No. 16/615,053, filed Nov. 19, 2019, now U.S. Pat. No. 11,243,901 which is a National Stage Application of PCT/US2018/028981, filed Apr. 24, 2018, which claims benefit of Serial No. 201710375581.0, filed May 24, 2017 in China and which applications are incorporated herein by reference. To the extent appropriate, a claim of priority is made to each of the above disclosed applications.

BACKGROUND

In recent years, to meet the growing requirements of high performance and power efficiency, field programmable gate array (FPGA) devices are deployed at a massive scale in various computer systems such as datacenters. In many use cases, an FPGA device will communicate with different types of other devices, such as other FPGA devices, processing devices (for example, a central processing unit (CPU), a graphic processing unit (GPU), and the like), storage devices (for example, a memory or an on-board dynamic random access memory (DRAM)), and the like. The different devices may be included in the same effective solution to support communications for the FPGA device.

SUMMARY

There is proposed a solution for supporting communications for a field programmable gate array (FPGA) device. In an implementation, the FPGA device includes an application module and a plurality of protocol stack modules. The protocol stack modules are operable to access a plurality of target devices based on different communication protocols via a physical interface of the FPGA device. The FPGA device further includes a universal access module operable to receive, from the application module, first data and a first identity of a first target device of the target devices, the first target device acting as a destination of the first data. The universal access module is further operable to transmit the first data to a first protocol stack module of the protocol stack modules based on the first identity and predetermined first routing information, the first protocol stack module being accessible to the first target device via the physical interface. By introducing the universal access module, it is possible to provide unified and direct communications for the application module.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference symbols are used to indicate the same or similar elements.

DETAILED DESCRIPTION

The subject matter described herein will now be discussed with reference to several example implementations. It should be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

Example Environment

Figure 1:
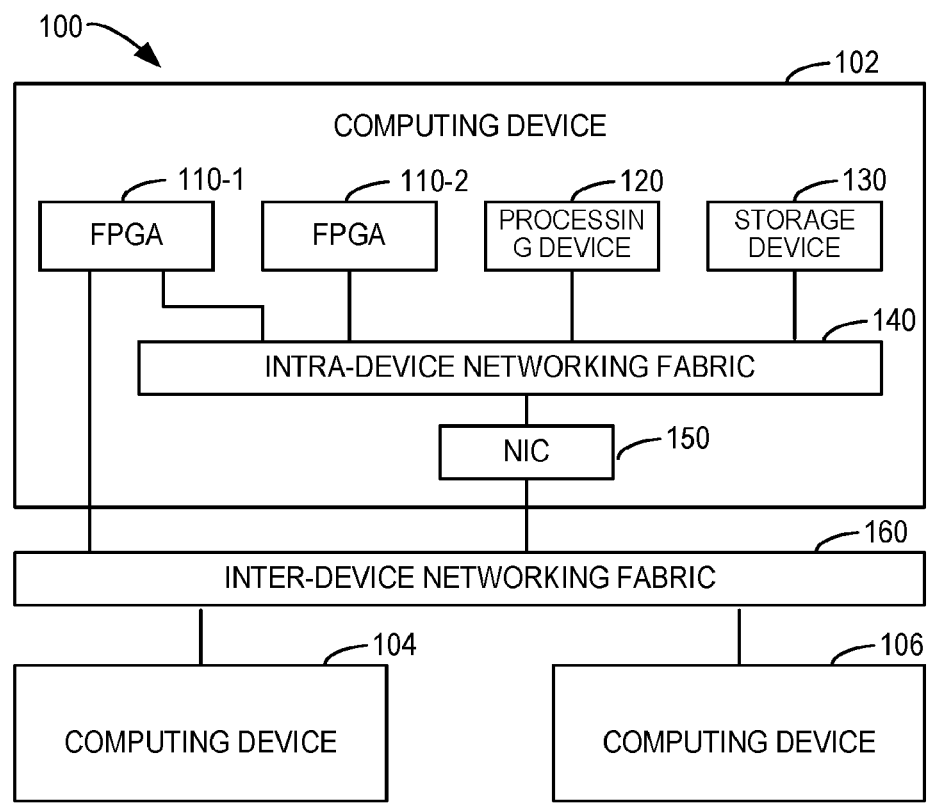
FIG. 1 illustrates a block diagram of a computing environment in which implementations of the subject matter described herein can be implemented.

FIG. 1 shows a block diagram of a computing environment in which implementations of the subject matter described herein can be implemented. In the computing environment 100, a plurality of computing devices 102, 104 and 106 are interconnected via an inter-device networking fabric 160. The system consisted of these computing devices can be used for various purposes such as computing, processing, and storage. One or more of the computing devices 102, 104, and 106 include processing and storage devices. The detailed structure of the computing device 102 is depicted in FIG. 1. As shown, the computing device 102 includes a plurality of FPGA devices 110-1 and FPGA devices 110-2 (hereinafter collectively referred to as FPGA devices 110 or individually referred to as an FPGA device 110), one or more processing devices 120, and one or more storage devices 130. The devices 110, 120 and 130 in the computing device 120 can be interconnected via an intra-device networking fabric 140. In some implementations, the intra-device networking fabric 140 may also be connected to the inter-device networking fabric 160 via a network interface card (NIC) 150 to enable communications with the other computing devices.

In some implementations, each of the FPGA devices 110 may be placed on a daughter-board (also referred to as an FPGA board) which may have different physical interfaces. One or more FPGA boards may be mounted on a mother board of the computing device 102 to have an interconnection with a physical interface(s) of other devices in the computing device 102 and to have an inter-device interconnection. In some other implementations, the FPGA boards may have direct communications with the inter-device networking fabric 160. For example, as shown in FIG. 1, the FPGA device 110-2 has a physical interface for connecting to the intra-device networking fabric 140. The FPGA device 110-2 has, in addition to a physical interface for connecting to the intra-device networking fabric 140, a different physical interface for directly connecting to the inter-device networking fabric 160.

In the computing device 102, the processing device 120 can perform various processing based on programs stored in the storage device 130. Examples of the processing device 120 may include, but are not limited to, a central processing unit (CPU), a graphic processing unit (GPU), and a controller. The processing device 120 may be a single-core or multi-core processing device. The storage device 130 may include various computer storage medium, including but not limited to volatile and non-volatile medium, removable and non-removable medium. The memory 130 may be a volatile memory (such as a register, cache, random-access memory (RAM), dynamic RAM (DRAM)), a non-volatile memory (such as a read only memory (ROM), electrically erasable programmable read only memory (EEPROM), flash memory, hard disk, and solid state disk (SSD)), or some combination thereof.

In some implementations, any of the computing devices 102, 104 and 106 can be implemented as a server terminal or a user terminal. The server terminal may be a server, a large-scale computing device and the like that is provided by a service provider. The user terminal may be any type of mobile terminal, fixed terminal, or portable terminal, including a mobile telephone, multimedia computer, multimedia tablet, Internet node, communicator, desk-top computer, laptop computer, notebook computer, netbook computer, tablet, and the like.

Although only the detailed structure of the computing device 102 is shown in FIG. 1, in some implementations, the devices 104 and 106 may also have some or all of the components as shown in the computing device 102 or may include different components. The components, their number, and connection therebetween are merely provided as an example in FIG. 1. In other implementations, the computing device 102 may include a different number of FPGA devices, processing devices, and storage devices or only include some of these devices. The connection of the devices included in the computing device 102 may also be different.

In the computing environment 100 shown in FIG. 1, an FPGA device 110 may need to communicate with another FPGA device, a processing device, and a storage device within the computing device 102 to exchange data. In addition, the FPGA device 110 may communicate with an FPGA device, a processing device, and a storage device within other computing devices 104 and 106. For example, in an FPGA-based distributed database system or a high-speed distributed storage system, an FPGA device will access local and remote storage devices frequently. In the FPGA-based big data analysis system, an FPGA device needs to communicate with local or remote processing devices (for example, CPUs) frequently. Furthermore, FPGA devices may be deployed at a massive scale in many machine learning systems to accelerate their computing capabilities. During the process, the data and intermediate computing results are transmitted among the FPGA devices continuously.

A device that the FPGA device is to communicate with may be referred to as a target device. The target device, as a communication object, can also be referred to as a resource device (or simply a resource) of the FPGA device. There are many use cases where communications between the FPGA device and the target device are needed. Generally, an FPGA device 110 has different physical interfaces that enable connections to target devices within the computing device 102 and to other computing devices (and in turn to target devices in those devices). Since the types and locations of the target devices are different and the physical interfaces in use are different, there are different protocol stack modules deployed in the FPGA device 110 to support communications with different target devices via different physical interfaces.

Figure 2:
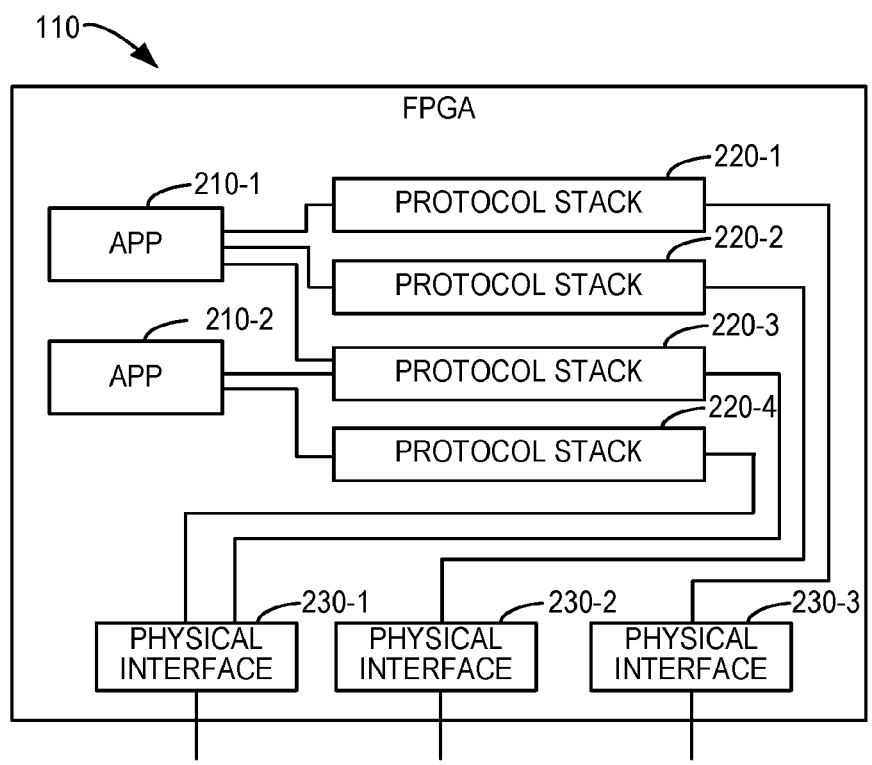
FIG. 2 illustrates a structural block diagram of a conventional FPGA device.

FIG. 2 illustrates a structural block diagram of a conventional FPGA device 110. As shown, the FPGA device 110 is deployed with a plurality of protocol stack modules 220-1 to 220-4 (hereinafter collectively referred to as protocol stack modules 220 or individually referred to as a protocol stack module 220). Different protocol stack modules are configured based on different communication protocols to support communications with target devices via respective physical interfaces 230-1, 230-1, and 230-3 (hereinafter collectively referred to as protocol stack modules 230 or individually referred to as a protocol stack module 230). The physical interfaces 230 can provide interconnections with corresponding physical interface of the target device.

In the FPGA device 110, there are one or more application modules 210-1 and 210-2 (hereinafter collectively referred to as application modules 220 or individually referred to as an application module 210). An application module can also be simply referred to as an application, which is a part of the FPGA device that is designed to perform tasks such as computing, processing, and/or analyzing. An application module 210 can establish a connection with a protocol stack module 220, if required, to transmit data from the corresponding physical interface to a target device or obtain data from the target device via the protocol stack module 220. Depending on different locations and types of the target devices, the application module 210 selects different protocol stack modules 220.

Hereafter there is provided a brief introduction of the physical interfaces 230 that may be included in the FPGA device 110 and some existing protocol stack modules 220.

The physical interfaces 230 generally includes one or more of a double data rate (DDR) controller interface, a peripheral component interconnect express (PCIe) interface, a quad small form-factor pluggable (QSFP) interface, a QSFP+ interface, and the like. The DDR controller interface is used for the FPGA device 110 to access an on-board DRAM (which is not shown, but is different from the storage device 130). The PCIe interface is used for the FPGA device 110 to communicate with the processing device 120, the storage device 130 in the same device or in other FPGA devices 110. The PCIe interface can communicate with the above devices through three different paths, including a DDR controller, a root complex and a PCIe switch. The QSFP or QSFP+ interface is a networking interface. The FPGA device 110 can be connected to the inter-device networking fabric 160 via the QSFP or QSFP+ interface as an independent node of the networking fabric, thereby achieving communications with other computing devices.

There are many protocol stack modules that can be deployed in an FPGA device 110 to support communications between the FPGA device 110 and a target device. These protocol stack modules can be designed and deployed according to the requirements and preferences of different developers and achieve perform communications based on their respective communication protocols. Some protocol stack modules can use the same physical interfaces. In some implementations, examples of the protocol stack modules 230 may include but are not limited to:

A DDR protocol stack module for processing communications via the DDR controller interface so as to access the on-board DRAM (located on the same board as the FPGA device);

A Direct memory access (DMA) protocol stack module for reading and/or writing data from and/or to the memory in the same device via the PCIe interface;

An FPGA/host protocol stack module for communicating with a local CPU via the PCIe interface;

An FPGA/GPU direct protocol stack module for enabling the FPGA device 110 to communicate with a GPU and GPU memory directly via the PCIe interface;

A lightweight transport layer (LTL) protocol stack module, which is a lightweight network stack for communications between the FPGA device 110 and a further FPGA device on the other computing devices via a networking protocol (such as the Ethernet), where this protocol stack module can utilize the QSFP or QSFP+ interface; and A Quantized Congestion Notification (QCN) protocol stack module, such as an IEEE 802.1Qau QCN protocol stack module, which can also be implemented on the FPGA device 110 for communications between different FPGA devices in different computing devices over the Ethernet, where this protocol stack module can utilize the QSFP or QSFP+interface.

Through the above protocol stack modules, it can be known that depending on the types and locations of target devices which different application modules 210 of the FPGA device 110 are to communicate with, respective connections between the application modules 210 and the corresponding protocol stack modules 230 will be established so that the application modules 210 can utilize the physical interface used by the connected protocol stack modules 230 to transmit data to and receive data from the target devices. Such communication process in the FPGA device has some limitations in terms of communication efficiency and scalability.

Specifically, different protocol stack modules may provide different interfaces. As such, the developers have to manually design the connection establishment between an application module and a protocol stack module according to the communication protocol that the protocol stack module is dependent on. This requires the developers to have well knowledge of the communication protocol and interface design for different protocol stack modules and design in advance possible communications for the application modules, which may not only increase the communication costs but also block the scaling of the FPGA communications. Furthermore, utilization of a physical interface by a protocol stack module is exclusive, namely, a physical interface can only serve one protocol stack module during a time period, which results in a significant delay for the protocol stack modules that want to communicate via a same physical interface.

In addition, because communications of the protocol stack modules are independent, if there is no direct connection between an FPGA device and a target device, the FPGA device is not able to communicate with that target device. This condition generally occurs when the FPGA device 110 expects to communicate with target devices on the other computing devices. For example, if the FPGA device 110 expects to transmit data to a DRAM on another computing device but is not connected directly with the DRAM (via the network), the FPGA device 110 may have to relay the data by means of the host CPU, which will result in some deterioration in speed and stability both as compared with data communication of pure hardware.

FPGA Communications with Universal Access Module

According to example implementations of the subject matter described herein, there is proposed a solution that supports communications for an FPGA device. In this solution, an FPGA device includes a universal access module for providing unified and direct communications between an application module(s) of the FPGA device and different protocol stack modules so that the FPGA device is accessible to an in-situ or remote target device. The unification is provided in that the access module can utilize a single interface for one or more application modules in the FPGA device to access their target devices. The universal access module is not an additional protocol stack module or physical interconnection but can be considered as an abstract overlay on the protocol stack modules included in the FPGA device. The universal access module can select, based on communications of an application module, a corresponding one of a plurality of protocol stack modules to achieve communication. Direct communication is represented in that in addition to target devices directly interconnected with the FPGA device via physical interfaces, direct access to target devices is provided between a local computing device and a remote computing device(s) by the universal access module, no matter if the FPGA device has a direct connection with these devices. Based on the features of the unification and direct communication, the universal access module can also be referred to as direct universal access (DUA) module or DUA overlay.

Figure 3:
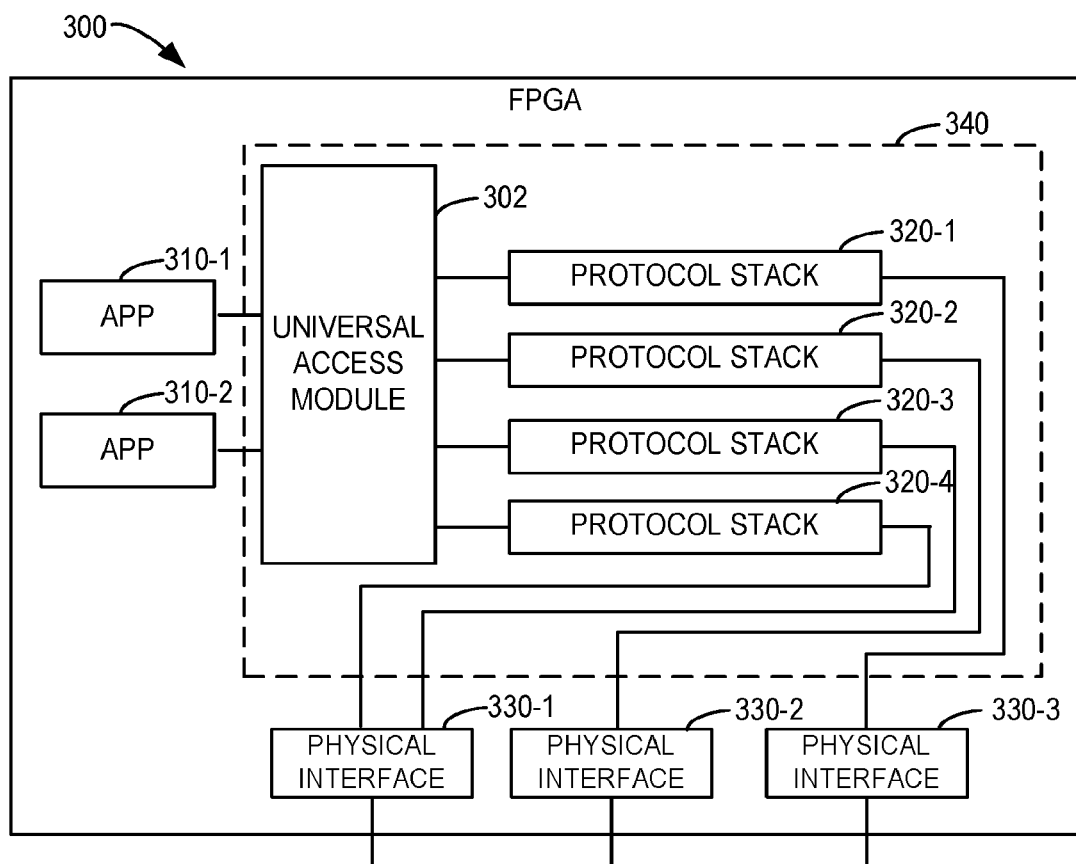
FIG. 3 illustrates a structural block diagram of an FPGA device in accordance with some implementations of the subject matter described herein.

Basic principles and various example implementations of the subject matter described herein will be described below with reference to the figures. FIG. 3 illustrates a structural block diagram of an FPGA device 300 in accordance with some implementations of the subject matter described herein. In some implementations, the FPGA device 300 can be implemented as an FPGA device in one or more of the computing devices 102, 104, and 106 in the computing environment 100. In the implementation of FIG. 3, the FPGA device 300 may include one or more application modules 310-1 and 310-2 (hereinafter collectively or individually referred to as application modules 310), a plurality of protocol stack modules 320-1 to 320-4 (hereinafter collectively or individually referred to as protocol stack modules 320), and one or more physical interfaces 330-1 to 330-3 (hereinafter collectively or individually referred to as physical interfaces 330). It is to be understood that the number of application modules, protocol stack modules and physical interfaces shown in FIG. 3 is only example. In other implementations, the FPGA device 300 may include more or less application modules (such as a single application module), more or less physical interfaces (such as a single physical interface), and a different number of protocol stack modules 320.

The plurality of protocol stack modules 320 are operable to access a plurality of target devices based on different communication protocols via the physical interfaces 330 of the FPGA device 300. Examples of the protocol stack modules 320 may include, for instance, one or more of the DDR protocol stack module, DMA protocol stack module, FPGA/host protocol stack module, FPGA/GPU direct protocol stack module, LTL protocol stack module, and QCN protocol stack module as mentioned above. The physical interfaces 330 may include, for instance, one or more of the DDR controller interface, PCIe interface and QSFP interface or QSFP+ interface. Depending on the designs of the protocol stack modules, the corresponding physical interfaces can be utilized. In some implementations, a plurality of protocol stack modules 320 (such as the protocol stack modules 320-3 and 32-4) are accessible to different target devices via a single physical interface 330 (such as the physical interface 330-1).

Depending on the physical interfaces 330 of the FPGA device 300 and the computing device where the FPGA device 300 is located as well as the interconnect structure in the computing environment, the accessible target devices may include the FPGA device(s), various processing devices, and storage devices in the computing device where the FPGA device 300 is located and/or remote computing devices. In the implementations of the subject matter described herein, an "accessible" target device refers to a device that can be connected directly or indirectly (such as through relay by other devices) via any of the physical interfaces 330 of the FPGA device 300. The FPGA device 300 may send/write data to these devices, and/or receive/read data from these devices.

According to the implementations of the subject matter described herein, the FPGA device 300 further includes a universal access module 302 which is used to provide a unified interface for the application modules 310 and the protocol stack modules 320. The universal access module 302 is used for forwarding to the corresponding protocol stack module 320 communications of the application modules 310 targeted to different target devices. Therefore, even if the FPGA device 300 includes various protocol stack modules 320, the application modules 310 can still achieve communications via the unified interface of the universal access module 302. Hence, the universal access module 302 acts as a router between the application modules 310 and the protocol stack modules 320 and can support data communications of the application modules 310 using the existing protocol stack modules 320 and physical interfaces 310. In this way, an application module 310 can transparently communicate with a plurality of target devices without learning in advance if these target devices are located in the local or remote computing device or have possible communication connection with them.

To achieve connection between different target devices in the local computing device and/or remote computing device, addressing and routing can be provided between the application modules 310 of the FPGA device 300 and the target devices to be accessed by the application modules. In the implementations of the subject matter described herein, different identities can be assigned to different target devices for addressing the target devices. Such an identity can be referred to as a universal identity (UID). As an initiator of communication, the FPGA device 300 can also be assigned with a corresponding UID. In some implementations, the Internet protocol (IP) address of the computing device (such as the server) in which the target device and the FPGA device 300 are located can be used as a part of their UIDs. In order to further differentiate different target devices and the FPGA device 300 in that computing device, unique identities in the device may be configured for them. In some other implementations, to differentiate the application modules 310 within the FPGA device 300 that has a plurality of application modules 310, the different application modules 310 within the same FPGA device 300 can be assigned with different UIDs. For an FPGA device acting as the target device, its different application modules 310 can also be assigned with different UIDs.

In addition to the identity for addressing, the universal access module 302 further utilizes routing information to route data of an application module 310 to a protocol stack module 320 of the accessible target device, or route the data obtained by a protocol stack module 320 to a corresponding application module 310. The routing information can be stored in advance in the universal access module 302 to indicate to which protocol stack module 320 the data are forwarded if a destination of the data is a certain target device. In some conditions of simple routing paths, the routing information can be configured in advance in the universal access module 302. In some other implementations, for different data communications, the routing information can be calculated and then returned to the universal access module 302 by a device or module having capability of processing. The management of the routing will be described below in detail.

The operations of the universal access module 302 in different cases of communication will be introduced below.

In some implementations, an application module 310 is expected to access data of a certain target device. The universal access module 302 receives, from the application module 310, data and an identity of a first target device of the plurality of target devices. For the purpose of illustration, the data and identity received from the application module 310 are referred to as first data and a first identity, respectively. By use of the first identity, the universal access module 302 can determine that the first target device acts as a destination of the first data. The application module 310 may need to access the first target device and thus provides the first data in various cases. For example, the application module 310 may need to transmit data to a processing device or FPGA device in the local or remote computing device or to write data to or read data from a storage device in the local or remote computing device. In the case of transmitting or writing data, the first data includes data that are actually to be transmitted or written by the application module 310, and in the case of reading stored data, the first data may include information identifying a read request for a data portion in the storage device.

To route the first data, the universal access module 302 transmits the first data to a corresponding protocol stack module 320 (referred to as a first protocol stack module 320) based on the first identity and predetermined routing information (referred to as first routing information). The first predetermined routing information may include mapping between the first identity and the first protocol stack module 320 as the first protocol stack module 320 is accessible to the first target device (which is the destination) via a physical interface 330 to which it is connected. In some implementations, the universal access module 302 may package the first data as a message and route it to the first protocol stack module 320. After receiving the first data transmitted by the universal access module 302 (or the first data in the form of message), the first protocol stack module 320 may process the received data or message according to its communication protocol and transmit a message to the connected physical interface. There is no limitation on the operation of the protocol stack module in implementations of the subject matter described herein. In some implementations, the application module 310 of the FPGA device 300 may transmit an identity of the application module 310 (referred to as a fourth identity) to the universal access module 302 in transmission of the first data. The fourth identity may be transmitted to the first protocol stack module 320 together with the transmission of the first data to identify the source of the first data.

In some implementations, the universal access module 302 may forward, to the application module 310, the data with a destination of the application module 310, which may occur in the case when the target device provides data to the application module 310 proactively or based on a request (such as a read request) of the application module 310. Specifically, the universal access module 302 receives data and an identity from a protocol stack module 320 (referred to as a second protocol stack module 320). For the purpose of illustration, the data and identity mentioned here are referred to as second data and a second identity, respectively. The second identity is the identity of a specific application module 310 in the FPGA device 300 and thus identifies the application module 310 as a destination of the second data. The universal access module 302 transmits the second data to the application module 310 based on the second identity and predetermined routing information (referred to as second routing information). The second routing information may include mapping between the second identity and the application module 310.

In addition to serving as a router between the application module 310 and the protocol stack module 320, in some other implementations, the universal access module 302 may act as a relay or router between different protocol stack modules 320 to implement data switching between different protocol stack modules 320. In these implementations, the universal access module 302 receives data and an identity from a protocol stack module 320. For the purpose of illustration, the data and identity mentioned here are referred to as third data and a third identity, respectively. The third identity refers to the identity of a target device (referred to as a second target device), indicating that the second target device is a destination of the third data. The universal access module 302 transmits the third data to a corresponding protocol stack module 320 (referred to as a third protocol stack module 320) based on the third identity and predetermined routing information (referred to as third routing information). The third routing information may include mapping between the third identity and the third protocol stack module 320. Thus, the third protocol stack module 320 is accessible to the second target device (which is the destination) via the physical interface 330 to which it is connected.

Data forwarding among the protocol stack modules 320 may occur in the following scenarios: the FPGA device that transmits the third data is not connected to the second target device directly but is connected to the FPGA device 300 (or connected to the FPGA device 300 via other devices) and the FPGA device 300 supports access to the second target device. In this scenario, the FPGA device 300 is used as the relay or router between the FPGA device transmitting the third data and the second target device. Specifically, the third data are first transmitted from an FPGA device (or through other devices) to a protocol stack module 320 of the FPGA device 300 via a physical interface of the FPGA device 300 (such as the physical interface 320-2). Then, the protocol stack module 320 that receives the third data provides the data to the universal access module 302, which further forwards the third data to the third protocol stack module 320 (such as the module 320-3) of the accessible second target device, so that the third protocol stack module 320 sends the third data out via the physical interface to which it is connected. The physical interface that the third protocol stack module 320 is connected to may be connected to the second target device directly or may require forwarding by other devices or networking fabrics before the third data reach the second target device. The physical interfaces in the FPGA device 300 that are used for receiving and transmitting the third data can be the same or different while the protocol stack modules that implement the reception and transmission are different.

As can be seen from the above process, the use of the universal access module 302 will not require modification of the addressing manner of the original protocol stack modules 320 but provides UID-based addressing on the protocol stack module 320. Therefore, the protocol stack module 320 can still operate according to its communication protocol. The universal access module 302 nay be only responsible for data routing between the application modules 310 and the protocol stack modules 320 within the FPGA device 300. It is possible that the introduction of the universal access module 302 in the FPGA device 300 does not affect the protocol stack modules 320, the intra-device networking connection of the FPGA device 300 in the local computing device and data communication through the network connection between the computing devices. The universal access module 302 and the protocol stack modules 320 may form a data plane 340 of the FPGA device 300 for data communications of the application modules 310 with the target devices via the physical interfaces.

In the above communications based on the universal access module 302, the first, second, and third identities include UIDs of the corresponding target device and the application modules in the FPGA device. In some other implementations, if there are different communication connections between the application modules 310 and the target devices, identities may be used to further differentiate these connections. In this case, in addition to a UID of the device or application module to identify the destination of the data, an identity of the connection may be additionally used to identify the different connections between the source and the destination of the data. For the purpose of differentiation, the identity of the connection is sometimes referred to as a fifth identity herein. The identity of a connection can be understood as an identity for a "port" of data communication of different traffic types between an application module 310 and the target device and thus, can be consisted of a port identity at the data source (referred to as a source connection identity or source port identity) and a port identity at the data a destination (referred to as a destination connection identity or a destination port identity). It should be appreciated that the application module 310 and the target device do not necessarily have actual ports for connection and the identity of the connection is used to only indicate the specific connection established for the corresponding communication.

After the connection is established, data between the application module 310 and the target device can be transmitted and received in the connection indicated by the identity of connection. There may be different communication connections between the application module 310 and the target device and these connections can be established and disconnected dynamically as required. In some implementations, the initiator of communication (such as the application module 310) may be aware of the destination connection identity and possibly, the source connection identity of the communication. In some other implementations, the source connection identity is unknown and may be assigned according to a request from the communication initiator (such as the application module 310). The assignment of the source connection identity can be performed by the processing device with capability of processing (such as the CPU). Examples of connection setup and the identity of connection will be discussed below.

Example implementations of the universal access module 302 and routing and connection management provided by a processing device for the universal access module 302 will be described in detail below.

Example Implementations of the Universal Access Module

As mentioned above, the universal access module 302 provides a unified interface for communication between the application modules 310 and the protocol stack modules 320. During the communication, the universal access module 302 acts as a router and routs the data from the application modules 310 or protocol stack modules 320 to other protocol stack modules 320 or application modules 310. In some implementations, the universal access module 302 may include a plurality of connectors and a switch fabric for interconnecting the plurality of connectors. Each of the connectors is connected with either an application module 310 or a protocol stack module 320.

Figure 4:
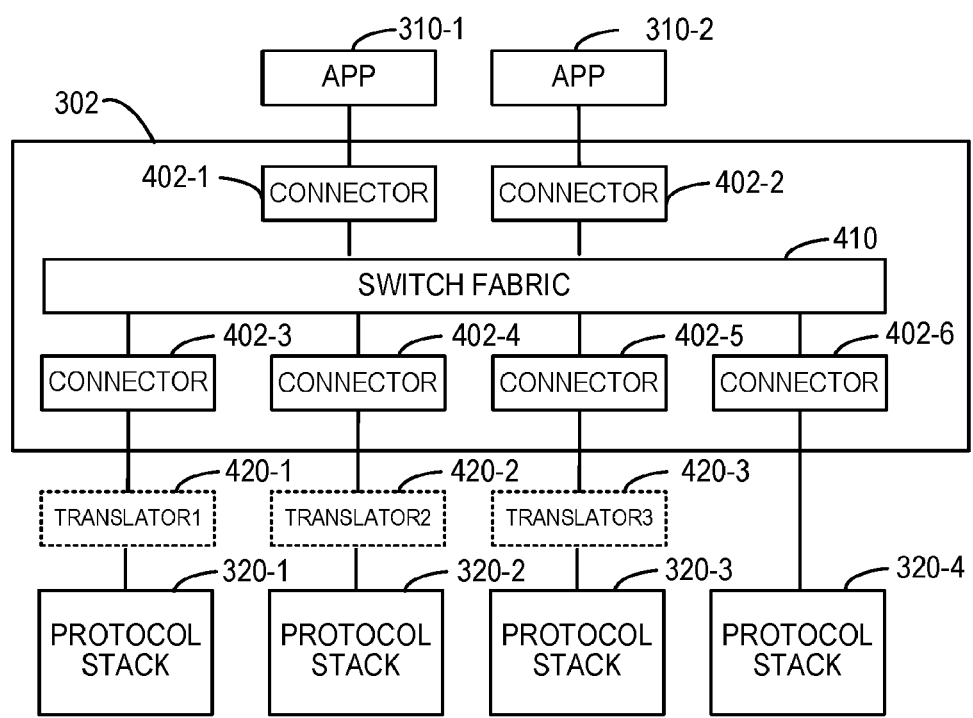
FIG. 4 illustrates an example structure of a universal access module in the FPGA device of FIG. 3 in accordance with some implementations of the subject matter described herein.

FIG. 4 illustrates an example structure of the universal access module 302. As shown, the universal access module 302 includes a plurality of connectors 402-1 to 402-6, connected to the application modules 301-1 and 310-2 and the protocol stack modules 320-1 to 320-4, respectively. The plurality of connectors 402-1 to 402-6 may have the same input/output (I/O) interfaces to expand to accommodate more application modules and protocol stack modules. The plurality of connectors 402-1 to 402-6 can be collectively or individually referred to as connectors 402 hereinafter. The plurality of connectors 402 are interconnected via the switch fabric 410 and each connector 402 may be regarded as a port of the switch fabric 41. The switch fabric 410 may be a crossbar switch for forwarding data input by a source port (connector) to a destination port (connector). Each connector 402 is provided between an application module 310 or protocol stack module 320 and the switch fabric 410. The data can be transmitted in the form of message in the universal access module 302 and the message can be referred to as a DUA message.

The universal access module 302 provides a unified interface through the connectors 402 so that the universal access module 302 is transparent to the application modules 310 and/or protocol stack modules 320. In some implementations, the application modules 310 or protocol stack modules 320 connected to the connectors 402 can initiate communications with the connectors 402 by means of communication primitives similar to the Berkeley Software Distribution (BSD) socket. Such primitives may include different types. A first type of primitives includes connection setup/close primitives including CONNECT, LISTEN, and CLOSE for indicating the application module 310 to setup and close a connection with a certain target device. A second type of primitives includes data transmission primitives including SEND, RECV, WRITE and READ primitives. The SEND or RECV primitives are used to indicate transmitting data to or receiving data from a computing device (such as a processing device and another FPGA device); while the WRITE or READ primitives are used to indicate writing data to or reading data from a storage device. There may be a CONFIG primitive for supporting an application module 310 to set parameters for communication. The specific usage of these primitives in the universal access module 302 will be described below. It is to be understood that the communication primitives described above are only some specific examples and in some implementations, it is possible to use only a portion of the above primitives. In other implementations, various other communication primitives may be defined to facilitate communications between the universal access module 302 and the application module 310 and/or protocol stack module 320.

Figure 5:
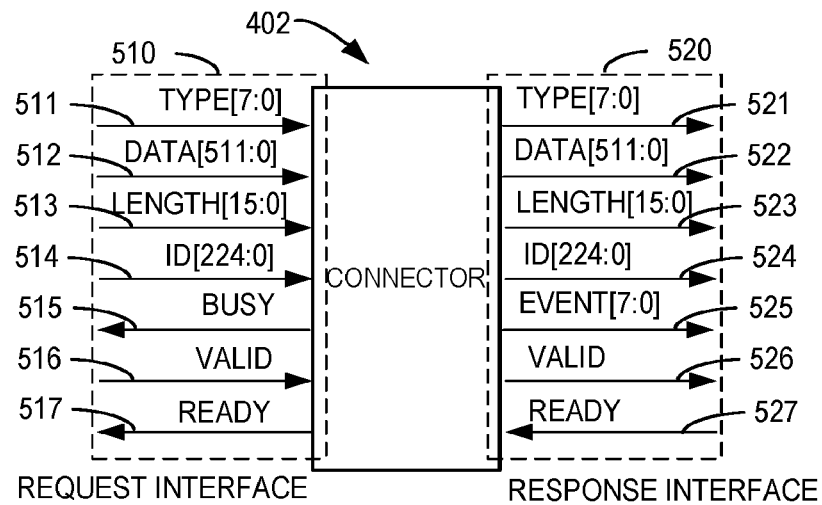
FIG. 5 illustrates an example structure of a connector in the universal access module of FIG. 4 in accordance with some implementations of the subject matter described herein.

Each connector 402 provides transmission and reception of DUA messages based on the above primitives. FIG. 5 illustrates an example I/O interface of a connector 402. The connector 402 may include a request interface 510 (used as an input interface) for receiving DUA messages from the connected application module 310 or protocol stack module 320 and a response interface 520 (used as an output interface) for transmitting DUA messages to the connected application module 310 or protocol stack module 320. The request interface 510 and response interface 520 receive and transmit DUA messages through different hardware sockets or ports, respectively. As being implemented in the FPGA device 300, the connector 402 supports communication in the form of hardware. In other words, the request interface 510 and the response interface 520 work simultaneously to receive and transmit messages continuously.

FIG. 5 also illustrates in detail information that may be transmitted/received by different ports of the request interface 510 and response interface 520 of the connector 402. As shown, the request interface 510 includes ports 511 to 517 for information reception from the application module 310 or protocol stack module 320 to the connector 402. The information received from the ports 511 to 514 may form an input DUA message of the connector 402 while information at other ports are used to facilitate the request interface 510 in receiving the DUA message. Information at different ports will be introduced below.

The port 511 receives type information of the application module 310 or protocol stack module 320 to indicate the type of the transmitted DUA message. If a request (input) of the request interface 510 is triggered by the application module 310, then the type of the received DUA message can be based on the above different communication primitives, such as CONNECT, LISTEN, CONNECTION CLOSING, SEND, RECV, WRITE, READ, CONFIG and so on. If the request (input) of the request interface 510 is triggered by the protocol stack module 320 and involves data transmission between the protocol stack modules, then the type is configured as "FORWARD." In the other conditions, if the request (input) of the request interface 510 is triggered by the protocol stack module 320, the type is configured to be similar to that of the application module 310 triggered based on the different communication primitives.

The ports 512 and 513 receive DUA data information and length information of the data from the application module 310 or protocol stack module 320, respectively. If the request (input) of the request interface 510 contains data that is actually to be transmitted (for example, the type is SEND, WRITE or FORWARD), the corresponding information can be received from the ports 512 and 513.

The port 514 receives identity (ID) information transmitted by the application module 310 or protocol stack module 320. The identity information identifies the destination device (as the first, second and third identities discussed above) of the data to be accessed (sent, read and written). In some cases, the identity information identifies the source device of the data (as the fourth identity discussed above). The identity of the destination device or source device (the application module of the FPGA device in some cases) can be referred to as a UID, as mentioned above. The identity information may further include an identity indicating a connection between the source of the data and the destination of the data and includes a source identity and a destination identity of the connection.

The ID at the port 514 can be represented as <src UID:src INST, dst UID:dst INST>, where src UID and dst UID are identities of the source device (or an application module therein) and a destination device (or an application module therein) of the message. src INST and dst INST form an identity of the connection from the source device (or the application module therein) to the destination device (or the application module therein), and sometimes can be considered as an identity of a port at the source of the data and an identity of a port at the destination of the data, where the two ports form a connection of the data to be transmitted. In some implementations, before the application module 310 sets up a connection with the target device, src INST of the ID may be unknown in the connection setup request message transmitted by the application module 310, and thus the corresponding field can be set as a predetermined value (such as a full-zero-value).

Figure 6:
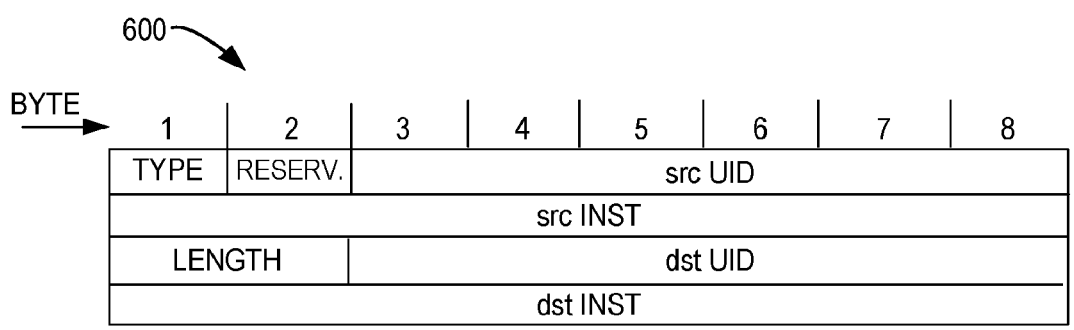
FIG. 6 illustrates a schematic diagram of a header format of a message in the universal access module in accordance with some implementations of the subject matter described herein.

During the information receiving process, the connector 402 can form a header of the DUA message with the information received from the ports 511 to 514, namely, with the type, length and ID information and use the data as a data portion of the DUA message. The format of the header is shown in FIG. 6. Although both FIG. 5 and FIG. 6 indicate the length of the bit/byte that the type, length, ID, and data might occupy, it is to be understood that it is merely an example, and the size of the information can be configured according to actual requirements.

The request interface 510 may further include a port 515 for the connector 402 to indicate to the connected application module 310 or protocol stack module 320 if the connector 402 is in a busy state. If the port is not set, the application module 310 or protocol stack module 320 is able to send information. The port can avoid contention of different connections of the same application module 310 or protocol stack module 320. The port 517 can also be used to indicate that the connector 402 is ready for reception. The port 516 is used for the application module 310 or protocol stack module 320 to indicate to the connector 402 that information transmitted by other ports to the connector 402 is valid.

The response interface 520 of the connector 402 may also include ports 521 to 527 for information transmission from the connector 402 to the application module 310 or protocol stack module 320. Information at the ports 521 to 524 is similar to that on the ports 511 and 514 of the request interface 510 and forms a DUA message output from the connector 402. The port 525 is an event port for returning a completion state (such as succeeded or failed) of the previous DUA message (at the request interface 510) to the application module 310 or protocol stack module 320. The port 526 indicates to the application module 310 or protocol stack module 320 that information transmitted by the connector 402 at the moment is valid and the port 527 is set to indicate to the application module 310 or protocol stack module 320 that it is ready to send messages.

With reference to the depiction of FIG. 5, the connector 402 can receive information from the application module 310 or protocol stack module 320 or transmit information to that module through its ports. Such information is packaged by the connector 402 in the form of DUA message (which may include a header and a data portion). In addition to receiving and transmitting DUA messages and other auxiliary information, the connector 402 further maintains and look up the routing information. The connector 402 may only maintain the routing involved by itself, such as routing information involving the application module or protocol stack module connected thereto. The connector 402 determines the output port of the DUA message (the output connector 402) based on the routing information and enables the DUA message to be forwarded via the switch fabric 410 to the corresponding connector 402, which may further forward it to the connected application module 310 or protocol stack module 320.

The unified interface of the connectors 402 in the universal access module 302 is described with reference to FIGS. 5-6. In the above description, during the process of data transmission, different communication cases involved by the universal access module 302 include data transmission initiated by an application module 310 and data transmission from a protocol stack module 320 to an application module 310 or other protocol stack modules 320. Other processes, such as the possible connection establishing, listening, closing, and configuring processes of an application module 310, may also include forwarding by the universal access module 302. From the perspective of the connectors 402, the transmission involved in these processes can be divided into two types: information from the outside of the universal access module 302 and information from the inside of the universal access module 302 (from the switch fabric 410). For these two types of processes, the message transfer process in the connector 402 will be described in brief.

When the connector 402 receives data from the outside of the universal access module 302, it may look up the routing information to determine the processing of the data and determine if the data are from an application module 310 or protocol stack module 320 by checking the type information at the port 511. If the type is FORWARD, it means that the data is already in a format of DUA message and thus, the connector 402 delivers, based on the routing information, the DUA message to the switch fabric 410 so as to be transmitted from other connectors 402 to the other protocol stack modules 320. If the type is not FORWARD, before looking up the routing information and transmitting the data of the port 512 to the switch fabric 410, the connector 402 packages the data as a DUA message (namely, using the type, length and ID information at the ports 511, 513 and 514 as a header of the DUA message, as shown in FIG. 6). If the data are from the application module 310 and the ID at the port 513 does not contain a source identity of the application module 310 (src UID) and a source identity of the connection (src IND), the connector 402 may also add src UID and src INST to the header of the DUA message.

When the receiver 402 receives information (in the form of DUA message) from the universal access module 302 (from the switch fabric 410), it can check if the destination ID (namely, dst UID and dst INST) of the DUA message are the identity of the application module 310 or protocol stack module 320 connected thereto. If it is, the connector 402 translates original data from the DUA message (namely, the data portion of the DUA message) and uses the data and header of the DUA message to set the corresponding ports of the response interface 520. If the destination ID is not the identity of the connected application module 310 or protocol stack module 320, the connector 402 set the type of the DUA message as a type of FORWARD and forwards the total DUA message to the connected protocol stack module 320. The protocol stack module 320 will process the whole DUA message as input data.

In some implementations, the switch fabric 410 of the universal access module 302 always forwards the input DUA message to a corresponding output port (corresponding connector 402). In some implementations, the input DUA message from one or more connectors 402 can be split into segments and forwarded to the corresponding output port via the switch fabric 410. The segments are then reorganized at the output port of the switch fabric and then transmitted to the corresponding connector 402.

Returning back to FIG. 4, in the above description, a protocol stack module 320 can be designed as supporting the request and response interfaces (or I/O interfaces) 510 and 520 of the connectors 402 of the universal access module 302. If one or more protocol stack modules 320 do not support such I/O interfaces, translators may be provided between the protocol stack modules 320 and the connectors 402 so that the protocol stack modules 320 can be connected to the universal access module 302 easily through these translators. As shown in FIG. 4, translators 420-1 to 420-3 (hereinafter collectively or individually referred to as translators 420) are provided between the protocol stack modules 320-1 to 320-3 and the corresponding connectors 402-3 to 402-4, respectively. The protocol stack module 320-4 has already been designed as being connectable to the connector 402 already.

A translator 420 can be designed separately according to a protocol stack module 320 connected thereto. For example, if the protocol stack module 320-1 is a DMA protocol stack module for accessing a storage device via a PCIe interface, then the translator 420-1 transforms the information from the response interface of the connector 402-3 to be a memory operation. If data of a READ type is received from the connector 402-3 (which means that the application module 310-1 or 310-2 initiates a read operation to the storage device), then the translator 420-1 can schedule the protocol stack module 320-1 to issue a read request, the address of which is determined based on the ID received at the ID port of the connector 402-3, particularly, based on dst INST in the ID. The translator 420-1 may also store the ID, so that the ID can be transmitted to the connector 402-3 along with read data when the data are received.

Through the above discussion, the universal access module 302 can support data routing between the application module 310 and the protocol stack module 320 by means of the connectors 402 and the switch fabric 410 (and possibly, by means of the translators 420). However, it should be appreciated that FIG. 4 to FIG. 6 only provide some specific examples of a structure of the universal access module 302 and a format of the message that can be utilized. In other implementations, the routing functionality of the universal access module 302 can be designed in other ways. Various routing methods, which are currently provided or to be developed in the future, can be employed to implement the universal access module 302.

Routing and Connection Management

Figure 7:
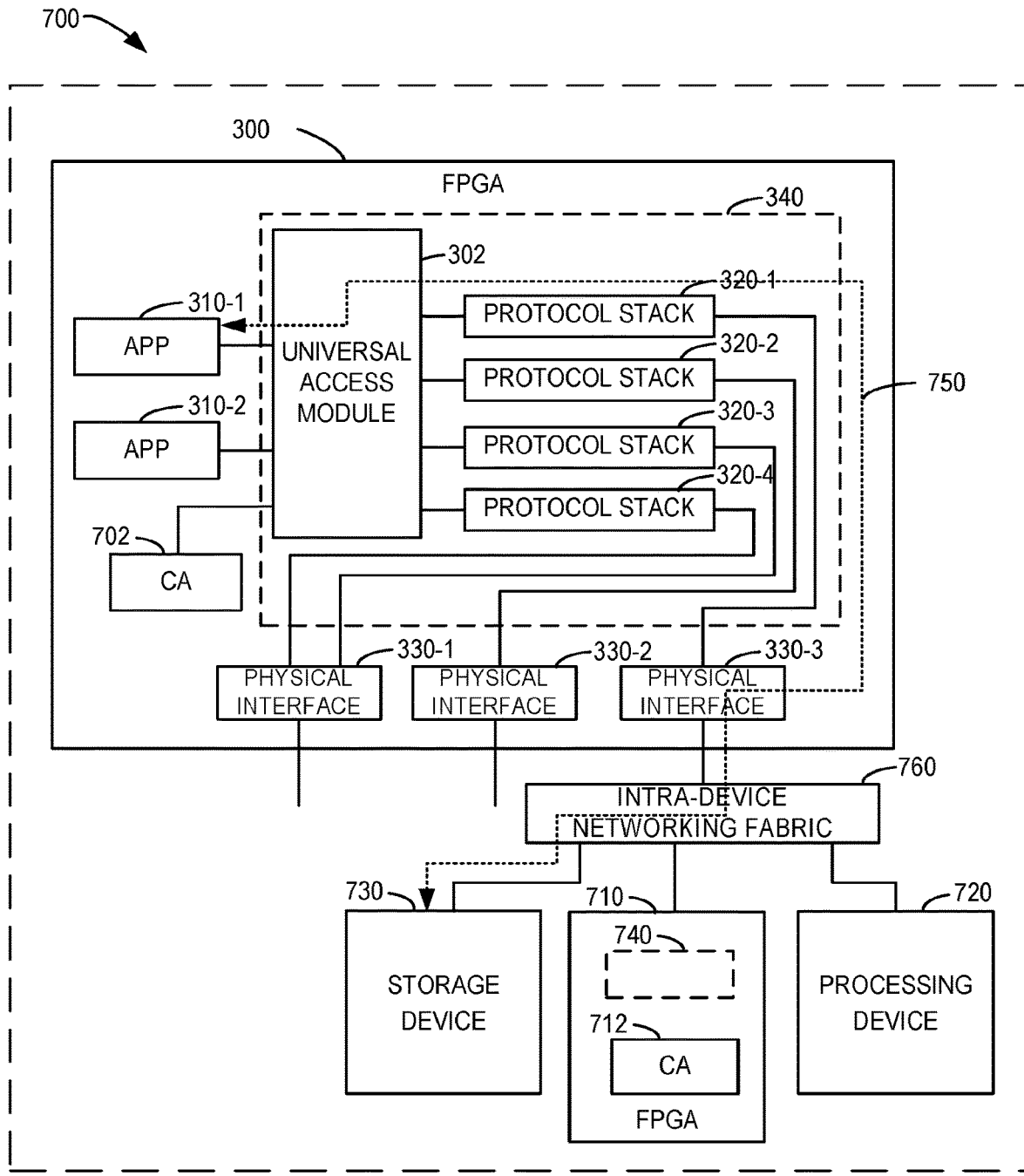
FIG. 7 illustrates a structural block diagram of a computing device including the FPGA device in accordance with some implementations of the subject matter described herein.

Before data communications for the FPGA device based on the universal access module 302, it may need to determine if a connection for communication to be established by the application module 310 is valid and to provide corresponding routing information. Such a process is referred to as a routing and connection management process. The routing and connection management process may be implemented by a processing device with high processing efficiency, such as a CPU. The processing device can be located in the same computing device with the FPGA device 300 and communicate with the FPGA device. FIG. 7 illustrates a schematic diagram of an example computing device 700 in which an FPGA device 300, a processing device 720, a further FPGA device 710, and a storage device 730 are deployed. The FPGA device 300 is a specific example of the FPGA device as discussed above with reference to FIG. 3. The storage device 730 is used to support connection and routing management of the universal access module 302 in the FPGA device 300. To reduce communications related to the connection and routing with the processing device 720 via the data plane 340, in some implementations, the FPGA device 300 further includes a control module (or a control agent (CA)) 702 for communicating with the processing device 720 in aspects of the connection and routing management. The CA 702 can communicate with the universal access module 302 via a connector 402 as depicted in FIG. 4 and FIG. 5. In some implementations, the FPGA device 710 is similar to the FPGA device 300 and thus may include a data plane 740 that is based on the universal access module 302, and a CA 712 for communicating with the processing device 720.

The processing device 720 may manage the devices in the computing device 700 and in response to a connection setup request from an application module of an FPGA device, verify if a connection is valid (for example, if the destination device identity and/or a destination connection identity is valid, or if an application module has authority to set up a connection). When the connection is determined to be valid, the processing device 720 may assign a possible source connection identity (such as src INST) and determine a routing path from the application module to the destination device. To implement the functionality, the processing device 720 may determine and maintain all the accessible resources in the computing device 700. In some implementations, the FPGA devices 300 and/or 720 include a plurality of application modules (and possible on-board DRAMs) which are all regarded as individual resources and thus can be managed by the CA 702 or 712 on the FPGA devices 300 and/or 720. The resources on the FPGA devices and other devices may be collected at the processing device 720.

The processing device 720 may store accessible resources in the computing device 700 and their addresses (for example, UIDs). An accessible resource refers to a device that can serve as a destination of an FPGA device or other communication initiators. For instance, in the example of FIG. 7, the computing device 700 may maintain a resource list in below Table 1. Table 1 indicates the accessible resources, their possible FPGA boards (for resources on the FPGA devices), and the identities (UIDs) for. addressing

TABLE 1

| Accessible resources | FPGA board | UID |
|---|---|---|
| On-board DRAM | FPGA 300 | 192.168.0.2:1:1 |
| Application module 310-1 | FPGA 300 | 192.168.0.2:1:2 |
| Application module 310-2 | FPGA 300 | 192.168.0.2:1:3 |
| On-board DRAM | FPGA 710 | 192.168.0.2:2:1 |
| Processing device 730 | \ | 192.168.0.2:0:1 |
| ... | ... | ... |

As mentioned above, a UID of an accessible resource in a computing device may be consisted of an IP address of the computing device and a unique identity assigned for that one of the plurality of resources in the computing device. For example, among the UIDs as listed in Table 1, 192.168.0.2 identifies the IP address of the computing device 700 and the additional identities (1:1, 2:1, 0:1) are used to differentiate the different resources on the FPGA board and other resources of the computing device 700.

In some implementations, the UID of each device or application module can be pre-assigned by the processing device 720 and obtained by that device or application module. For example, the processing device 720 may transmit the assigned UIDs to the CA 702 on the FPGA device 300 and the CA 712 on the FPGA device 710, which is then buffered and/or transmitted to their corresponding devices and/or application modules by the CAs 702 and 712. In some implementations, if some resources are changed in the computing device 700, for example, if a certain processing device is failed or removed, an application module is added or deleted from an FPGA device, and an FPGA device is plugged in or out, and the like, the processing device 720 may update Table 1 accordingly and possibly assign UIDs for the new devices.

The UIDs are maintained for the connection and routing management of the application modules 310 in the FPGA device 300. When an application module 310 expects to communicate with a certain target device, the processing device 720 may determine if there is a routing path from the application module 310 to the target device in the whole computing device 700, or even in the system formed by other computing devices that are capable of communicating with the computing device 700. If such routing path exists and the connection port (identified by dst INST) of the target device involved in the routing path is valid, the processing device 720 may establish a connection to the target device for the application module 310. In some implementations, the processing device 720 may also assign a source connection identity (src INST) for the connection, and the assigned connection identity may be used in communications of the application module 310.

Specifically, the application module 310 transmits to the universal access module 302 a connection setup request for a connection between the application module 310 and the target device (the type information received by the connector 402 is a CONNECT type). The connection setup request includes at least an identity of the target device (dst UID) and a destination connection identity (dst IND). In this case, dst UID and dst INST can be configured in the data transmitted by the data port of the connector 402. The universal access module 302 can transmit the request to the processing device 720, for example, via the CA 702 in the FPGA device 300. Based on determining that the type information received from the port is a CONNECT type, a connector 402, which is connected to the application module 310 in the universal access module 302, forwards the formed DUA message to a connector 402 that is connected to the CA 702.

The connector 402 connected to the application module 310 may further set dst UID in the header of the DUA message as a UID of the CA 702 and set src UID as a UID of the application module 310, so that the switch fabric 410 can transmit the DUA message to the connector 402 that is connected to the CA 702. In some implementations, src UID can be included by the application module 310 in the connection setup request and is transmitted to the universal access module 302. In some implementations, the connector 402 connected to the CA 702 may further include in the connection setup request dst UID and dst INST that are related to the connection setup request and packages the identities into a data portion of the DUA message. The DUA message is transmitted to the CA 702 (via the response interface).

The CA 702 transmits the connection setup request forwarded by the universal access module 302 (in the form of DUA message) to the processing device 720. The CA 702 may extract dst UID and dst INST from the data portion of the DUA message to provide the identities to the processing device 720, so that the processing device 720 can establish a connection between the application module 310 that initiates the request and the corresponding target device, and allocate the routing information. The processing device 720 verifies if there is a communicable connection from the application module 310 to the target device based on the received identity (dst UID) identifying the target device with which the application module 310 is to communicate and the identity (src UID) of the source (the application module 310) that initiates the request. For instance, in the example of FIG. 7, it is assumed that the application module 310-1 requests to set up a connection with the processing device 730. The processing device 720 determines that the application module 310-1 can be connected to the storage device 730 by the protocol stack module 320-1 via the physical interface 330-3 and the intra-device networking fabric 760, as illustrated by a path 750 in FIG. 7. Based on the determination, the processing device 720 may assign a source connection identity to the connection. The src INST identity is used to identify the connection within the application module 310, while dst INST, which is known by the application module 310, is used to identify the connection within the target device (in this example, the storage device 730).

If the processing device 720 determines that the connection between the application module 310 and the target device is valid, it may provide, to the CA 702 on the FPGA device 300, a response to the connection setup request. The assigned source connection identity (src INST) and the possible a destination connection identity (dst INST) may be included in that response. The universal access module 302 may obtain from the CA 702 the response to the connection setup request for the application module 310 and transmit the response to the application module 310 that initiates the request.

In the above connection setup process, the processing device 720 determines from the perspective of the system if the connection between the application module 310 that initiates the request and the target device is valid and can be established. The processing device 720 may determine that the application module 310 is a valid device, for example, based on the resource addressing table shown in Table 1. The processing device 720 may also maintain internal resources that can serve as the target devices in the computing device 700, and an interconnection information table for these resources and other target devices outside the computing device 700. The interconnection information table indicates that other FPGA devices, processing device, or storage devices in the host or remote computing device that are connectable by each FPGA device via any of its physical interfaces. An example of the interconnection table is provided below.

TABLE 2

| Source FPGA | Target device/protocol stack module/physical interface |
|---|---|
| FPGA device 300 | FPGA device 710/protocol stack module 320-1/physical interface 330-3 |
| FPGA device 300 | Processing device 720/protocol stack module 320-1/physical interface 330-3 |

TABLE 2-continued

| Source FPGA | Target device/protocol stack module/physical interface |
|---|---|
| FPGA device 300 | FPGA device on a remote computing device/protocol stack module 320-2/physical interface 330-2 |
| FPGA device 710 | FPGA device 300/protocol stack module aaa (not shown)/physical interface bbb (not shown) |
| FPGA device 710 | FPGA device on another computing devices/protocol stack module ccc (not shown)/physical interface ddd (not shown) |
| ... | ... |

The processing device 720 may determine, based on the interconnection information provided in Table 2, that an application module 310 in the FPGA device 300 can establish a connection with the FPGA device 710. The FPGA devices 300 and 710 may report their interconnection conditions to the processing device 720. When the networking condition changes in the FPGA device and in the computing device 700, the processing device 720 may be notified the change and then update the maintained interconnection information accordingly. It would be appreciated that Table 2 provides only an example of the interconnection information maintained by the processing device 720. The processing device 720 can maintain the interconnection information in other manners.

If the processing device 720 verifies that the connection from the application module 310 to the target device is valid, it means that there is a routing path from the application module 310 to the target device. The determination of the routing path is also based on the identity of the application module 310 and the identity of the target device to be communicated with. The routing path may involve multi-hop routing of a plurality of devices, protocol stack modules, physical interfaces, and networking fabrics from the application module 310 to the target device. The processing device 720 may transmit to the related devices routing information indicating the different hops. For example, the processing device 720 may transmit, to the universal access module 302 in the FPGA device 300 (via the CA 702), routing information indicating a part of the path within the FPGA device 300. The routing information transmitted to the FPGA device 300 may be buffered in the universal access module 302, and specifically in the involved connector(s) 402. The routing information may include mapping between the identity of the application module 310 (and the connection identity) and a protocol stack module 320. When data of the application module 310 for a corresponding connection are received, the universal access module 302 may identify, based on the routing information, how to transmit the data to the corresponding protocol stack module 320 so that the data can arrive at the target device.

In some implementations, if the routing path determined for the application module 310 and the target device additionally involves other devices, the processing device 720 may further transmits, to the other devices, routing information indicating the rest of the routing path within the other device. This occurs when there is no direct connection between the FPGA device 300 in which the application module 310 is included and the target device and thus it may require intermediate devices, including intermediate FPGA devices, to relay the data of the application module 310. To ensure routing of data, the processing device 720 can also transmit the corresponding routing information to the devices that are involved.

By setting up the connection and determining routing information for the application module 310 by the processing device 720, the processing device 720 with efficient processing capability can be utilized to determine the routing path that reach the host or remote target device for the application module 310 as far as possible. During the process of routing management, information indicating the total routing path is divided into routing information related to respective devices and transmitted to the related devices for use, which may further save the storage space for each of the devices and improve the routing efficiency.

In some implementations, when a connection is set up for the application module 310, and there is a connection from the computing device 700 that includes the FPGA device 300 to the remote device (for example, from a LTL protocol stack module to another LTL protocol stack module in another computing device via a QSPF+ physical interface), then the communication between the computing devices can be configured as tunnel communication. The tunnel communication can be shared by a plurality of connections of the one or more application modules 310 of the FPGA device (if exist). In the tunnel communication, data or message of different connections are transmitted to the other computing device in the form of data flow and further transmitted to the target device(s) in the other computing device, such as the FPGA device, processing device and/or storage device.

In some implementations, the application module 310 may further request to close the established connection. A request for closing the connection may be transmitted to the processing device 720 via the universal access module 302 and the CA 702. The processing device 702 may release the corresponding connection based on the request of the application module 310 and the connection identity of the connection can be reassigned to other connections. The processing device 720 may transmit a response of successfully closing the connection to the universal access module 302 via the CA 702. In this case, the universal access module 302 can delete the routing information stored for the connection. The universal access module 302 can further transmit the response of successfully closing the connection to the application module 310 which can stop utilizing the connection accordingly. In some cases, if there is a failure on a connection (for example, the target device, or the physical interface, the universal access module, or the protocol stack module of the FPGA device on the routing path of the connection is failed), the processing device 720 may also close the connection.

It has been described above the support of the connection and routing management by the processing device 720 for the FPGA device 300. The processing device 720 and the CA 702 on the FPGA device 300 may be regarded as a control plane for communications of the FPGA device, to providing support controlling of communications of the FPGA device. In some implementations, the other FPGA device 710 in the computing device 700 can be deployed with a data plane 740 that is similar to the data plane 340 of the FPGA device 300, for providing unified and direct communication between its application modules and protocol stack modules. In this case, the FPGA device 740 may further include a CA 712 for interacting with the processing device 720 for controlling of the communications.

In some implementations, instead of utilizing a separate processing device 720 to support the connection and routing management, the CA 702 in the FPGA device 300 can serve as a processing device to achieve similar functions as the processing device 720 described above, for example, setting up connections for communications of the application modules 310, calculating the routing paths, closing the connection, and the like.

Multiplexing of the Physical Interfaces

Figure 8:
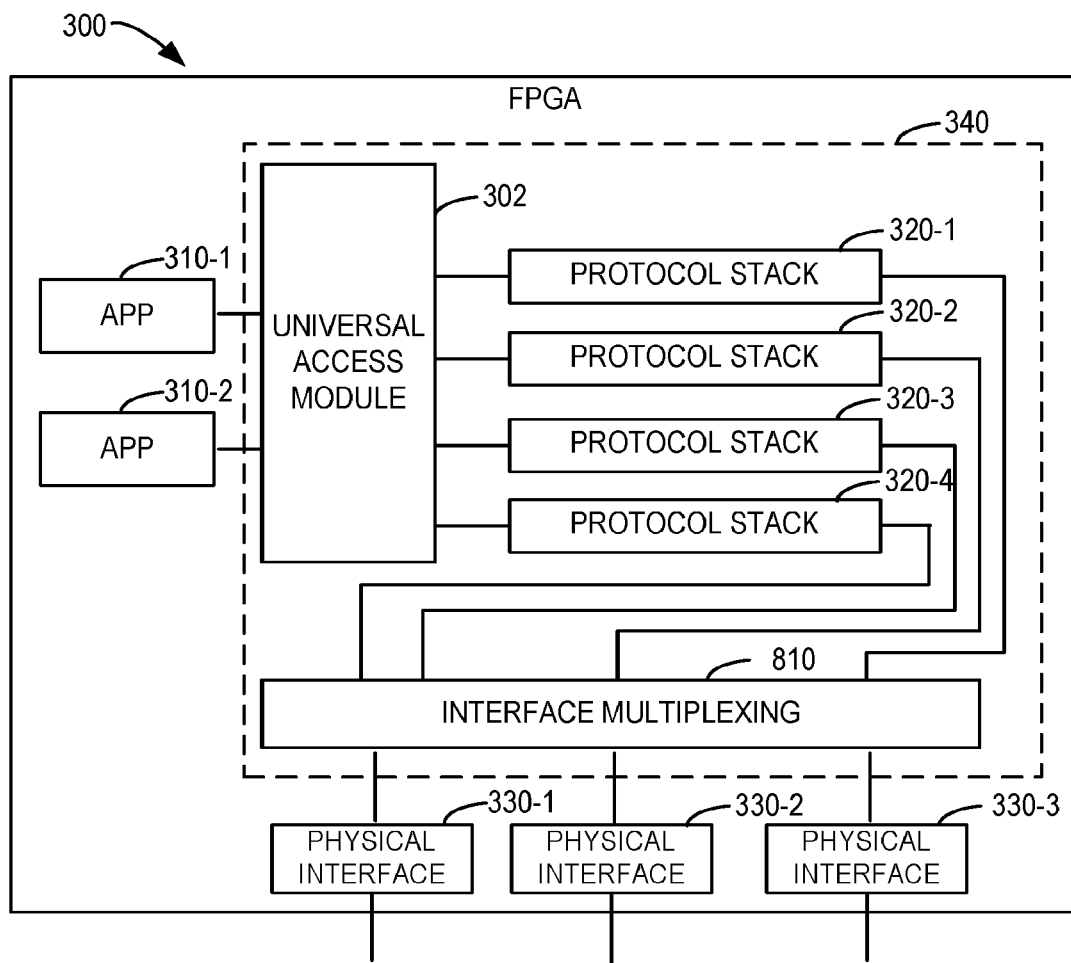
FIG. 8 illustrates a structural block diagram of an FPGA device in accordance with some other implementations of the subject matter described herein.

It has been described above the example implementations of the universal access module 302 and the connection and routing management support for the communications based on the universal access module 302. As mentioned above, the universal access module 302 provided between the application modules 310 and the protocol stack modules 320 can be considered as an abstract overlay on the protocol stack modules. In some implementations, a layer (or module) may also be configured under the protocol stack modules 320 to provide multiplexing between the protocol stack modules 320 and the physical interfaces 330. FIG. 8 illustrates such an example implementation. As shown in FIG. 8, an interface multiplexing module 810 is provided between the protocol stack modules 320 and the physical interfaces 330 of the FPGA device 300. The interface multiplexing module 810 is operable to schedule the physical interfaces 330 to transmit a message of the protocol stack modules 320 based on a predetermined scheduling policy. As compared to the DUA overlay of the universal access module 302, the interface multiplexing module 810 may be referred to as a DUA underlay.

Since the plurality of protocol stack modules 320 are based on a variety of designs, the protocol stack modules 320 may transmit data to different target devices via the same physical interface 330 of the FPGA device 300. For example, in the examples of FIG. 3 and FIG. 8, both the protocol stack modules 320-3 and 320-4 need to transmit messages via the physical interface 330-1. In the communications based on the universal access module 330, the universal access module 330 may transmit the data (DUA messages) to different protocol stack modules 320 at the same time. The protocol stack modules 320 package the received data as corresponding messages based on the respective communication protocols for transmission. If a plurality of protocol stack modules 320 need to transmit messages via the same physical interface 330 at the same time, the interface multiplexing module 810 can act as a multiplexer and schedule the physical interface 330 to transmit data of each of the protocol stack modules 320. The interface multiplexing module 810 may utilize various scheduling polices to determine to which protocol stack module the physical interface 330 can be scheduled to transmit the data. Such scheduling policies include, but are not limited to, a fair-sharing policy, weighted sharing measurement, a strict priority policy, and so on.

When the interface multiplexing module 810 receives from the physical interfaces 330 data to be transmitted to the protocol stack modules 320, it can act as a de-multiplexer to transmit messages received from a same physical interface to the corresponding protocol stack modules. In the case that one physical interface 330 serves only one protocol stack module 320, for example, the physical interface 320-2 for the protocol stack module 320-2 and the physical interface 320-3 for the protocol stack module 320-1, the interface multiplexing module 810 does not need to perform the multiplexing and demultiplexing of the messages.

The FPGA device has been described above according to the example implementations of the subject matter described herein and various example implementations based on the universal access module, processing device and interface multiplexing module have been provided. According to the implementations, the FPGA device can obtain advantages from various aspects in performing data communications. For example, by introducing a universal access module, a unified interface is provided for an application module to achieve data communication via different protocol stack modules. In this way, the application module will not have to change its interface design depending on the underlying different protocol stack modules, thereby achieving a simple communication process. Furthermore, the routing function of the universal access module (as well as the routing management supported by the processing device) can provide direct access for the application module. As such, the application module may not have to learn in advance the location and type of the target device to be communicated and learn if there is a direct connection therewith.

Additionally, the FPGA device according to the implementations of the subject matter described herein can keep backward compatibility. The existing protocol stack modules in the FPGA device can work easily without changing their specified communication process and the FPGA device can be deployed on any FPGA boards, computing devices, and computing environments having different networking fabrics. The FPGA device can also provide high scalability to accommodate various new designed protocol stack modules and application modules in the FPGA device, which can also work well. In addition, the universal access module and/or interface multiplexing module facilitate simultaneous communication of a relatively large number of application modules and protocol stack modules so that the FPGA device can achieve significant improvements in terms of efficiency and time delay.

Furthermore, the FPGA device according to the implementations of the subject matter described herein can also provide security advantages. For example, in some cases, the physical hardware (for example, the PCIe address) may be accessed directly without security check, resulting in data of the physical address being tampered with a malicious intent and other security problems. By checking the access data by means of the DUA overlay included in the FPGA device according to the implementations of the subject matter described herein, it is possible to prevent the unauthorized access. In addition, potential malicious application modules can be isolated from the communications of the FPGA device according to the implementations of the subject matter described herein. For instance, traffic can be controlled using the DUA overlay and DUA underlay so as to avoid failed communications of the application modules caused by malicious transmissions of a certain application module.

Example Processes

Figure 9:
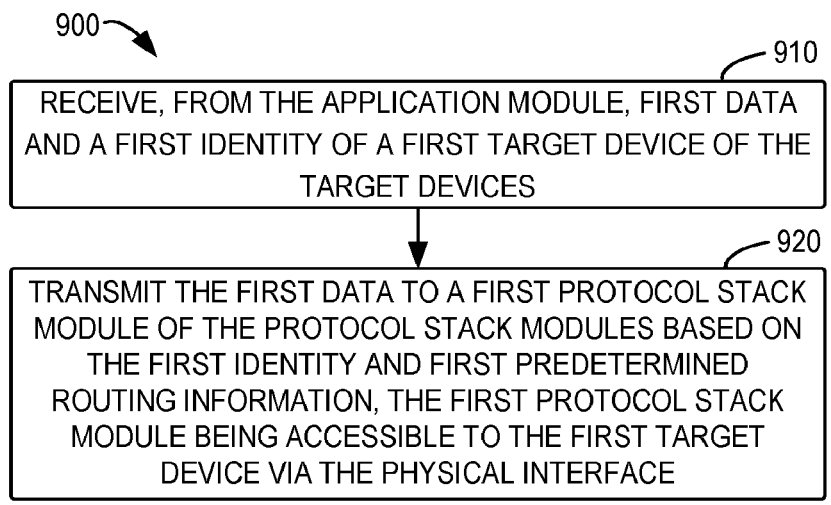
FIG. 9 illustrates a flowchart of a process of communication for an FPGA device in accordance with some implementations of the subject matter described herein.

FIG. 9 illustrates a flowchart of a process 900 of communications for an FPGA device in accordance with some implementations of the subject matter described herein. The process 900 can be implemented by the FPGA device according to the implementations of the subject matter described herein, for example, the FPGA device 300 in FIG. 3, FIG. 7 and FIG. 8. At 910, the FPGA device 300 receives, from an application module, first data and a first identity of a first target device of a plurality of target devices. The first target device acts as a destination of the first data. At 920, the FPGA device 300 transmits the first data to a first protocol stack module of a plurality of protocol stack modules based on the first identity and first predetermined routing information, the first protocol stack module being accessible to the first target device via a physical interface. This implementation can be implemented by the universal access module 302 in the FPGA device 300.

In some implementations, the process 900 may further include: receiving second data and a second identity of the application module from a second protocol stack module of the plurality of protocol stack modules, the application module acting as a destination of the second data; and transmitting the second data to the application module based on the second identity and second predetermined routing information. These implementations can be implemented by the universal access module 302 in the FPGA device 300.

In some implementations, the process 900 may further include: receiving, from a further protocol stack module, third data and a third identity of a second target device of the plurality of target devices, the second target device acting as a destination of the third data; and transmitting the third data to a third protocol stack module of the plurality of protocol stack modules based on the third identity and third predetermined routing information, the third protocol stack module being accessible to the second target device via the physical interface. These implementations can be implemented by the universal access module 302 in the FPGA device 300.

In some implementations, the process 900 may further include: receiving, from the application module, a fourth identity of the application module in the FPGA device and a fifth identity for a connection between the application module and the first target device; and transmitting, to the first protocol stack module, the first data in association with the first, fourth, and fifth identities. These implementations can be implemented by the universal access module 302 in the FPGA device 300.

In some implementations, the process 900 may further include: receiving, from the application module, a connection setup request for the connection between the application module and the first target device, the connection setup request including at least the first identity; obtaining a response to the connection setup request, the response including the fifth identity; and transmitting, to the application module, the response to the connection setup request. These implementations can be implemented by the universal access module 302 in the FPGA device 300. In some implementations, the fifth identity may be obtained by means of a processing module of the FPGA device 300, such as the CA 702. The CA 702 may assign the fifth identity in response to the connection setup request or obtain the fifth identity by interactions with a central processing device (such as a CPU) in the host of the FPGA device 300.

In some implementations, the process 900 may further include: determining, based on the first and fourth identities, a routing path from the application module of the FPGA device to the first target device; and determining the first routing information indicating a part of the routing path within the FPGA device. These implementations can be implemented by the CA 702 in the FPGA device 300. In some other implementations, the determination of the routing path and the routing information may be performed by a central processing device (such as a CPU) in the host of the FPGA device 300, and the universal access module 302 of the FPGA device 300 may obtain the routing information.

In some implementations, the process 900 may further include: transmitting, to a further device, further routing information indicating a remaining part of the routing path within the further device. These implementations can be implemented by the CA 702 in the FPGA device 300. In some other implementations, the transmission of the remaining part of the routing information may be performed by a central processing device (such as a CPU) 720 in the host of the FPGA device 300.

In some implementations, the process 900 may further include: scheduling, based on a predetermined scheduling policy, the physical interface to transmit a message from the first protocol stack module, the message being generated from the first data. These implementations may be implemented by the interface multiplexing module 810 in the FPGA device 300.

In some implementations, the FPGA device 300 is included in a first computing device and the plurality of target devices are selected from a group consisting of: a further FPGA device, a processing device, or a storage device included in the first computing device; or an FPGA device, a processing device, or a storage device included in a remote second computing device.

Example Implementations

Some example implementations of the subject matter described herein are listed as follows:

In one aspect, there is provided a field programmable gate array (FPGA) device. The FPGA device comprises: an application module; a plurality of protocol stack modules operable to access a plurality of target devices based on different communication protocols via a physical interface of the FPGA device; and a universal access module operable to: receive, from the application module, first data and a first identity of a first target device of the plurality of target devices, the first target device acting as a destination of the first data, and transmit the first data to a first protocol stack module of the plurality of protocol stack modules based on the first identity and first predetermined routing information, the first protocol stack module being accessible to the first target device via the physical interface.

In some implementations, the universal access module is further operable to: receive second data and a second identity of the application module from a second protocol stack module of the plurality of protocol stack modules, the application module acting as a destination of the second data; and transmit the second data to the application module based on the second identity and second predetermined routing information.

In some implementations, the universal access module is further operable to: receive, from a further protocol stack module, third data and a third identity of a second target device of the plurality of target devices, the second target device acting as a destination of the third data; and transmit the third data to a third protocol stack module of the plurality of protocol stack modules based on the third identity and third predetermined routing information, the third protocol stack module being accessible to the second target device via the physical interface.

In some implementations, the universal access module is further operable to: receive, from the application module, a fourth identity of the application module in the FPGA device and a fifth identity of a connection between the application module and the first target device; and transmit, to the first protocol stack module, the first data in association with the first, fourth, and fifth identities.

In some implementations, the universal access module is further operable to: receive, from the application module, a connection setup request for the connection between the application module and the first target device, the connection setup request including at least the first identity; transmit the connection setup request to a processing device; receive, from the processing device, a response to the connection setup request, the response including the fifth identity; and transmit, to the application module, the response to the connection setup request, the response comprising a fifth identity.

In some implementations, the processing device is included in the FPGA device, or the processing device is separated from and communicatively coupled with the FPGA device.

In some implementations, the processing device is configured to: determine, based on the first and fourth identities, a routing path from the application module of the FPGA device to the first target device; and transmit, to the universal access module, the first routing information indicating a part of the routing path within the FPGA device.

In some implementations, the processing device is further configured to: transmit, to a further device, further routing information indicating a remaining part of the routing path within the further device.

In some implementations, the universal access module includes a plurality of connectors and a switch fabric interconnecting the plurality of connectors, the plurality of connectors being connected with the application module and the plurality of protocol stack modules, respectively.

In some implementations, the FPGA device further comprises: an interface multiplexing module provided between the plurality of protocol stack modules and the physical interface, the interface multiplexing module being operable to: schedule, based on a predetermined scheduling policy, the physical interface to transmit a message from the first protocol stack module, the message being generated from the first data.

In some implementations, the FPGA device is included in a first computing device, and the plurality of target devices are selected from a group consisting of: a further FPGA device, a processing device, or a storage device included in the first computing device; or an FPGA device, a processing device, or a storage device included in a remote second computing device.

In another aspect, there is provided a method implemented at a field programmable gate array (FPGA) device. The FPGA device comprises an application module and a plurality of protocol stack modules, the plurality of protocol stack modules being operable to access a plurality of target devices based on different communication protocols via a physical interface of the FPGA device. The method comprises: receiving, from the application module, first data and a first identity of a first target device of the plurality of target devices, the first target device acting as a destination of the first data; and transmitting the first data to a first protocol stack module of the plurality of protocol stack modules based on the first identity and first predetermined routing information, the first protocol stack module being accessible to the first target device via the physical interface.

In some implementations, the method further comprises: receiving second data and a second identity of the application module from a second protocol stack module of the plurality of protocol stack modules, the application module acting as a destination of the second data; and transmitting the second data to the application module based on the second identity and second predetermined routing information.

In some implementations, the method further comprises: receiving, from a further protocol stack module, third data and a third identity of a second target device of the plurality of target devices, the second target device acting as a destination of the third data; and transmitting the third data to a third protocol stack module of the plurality of protocol stack modules based on the third identity and third predetermined routing information, the third protocol stack module being accessible to the second target device via the physical interface.

In some implementations, the method further comprises: receiving, from the application module, a fourth identity of the application module in the FPGA device and a fifth identity for a connection between the application module and the first target device; and transmitting, to the first protocol stack module, the first data in association with the first, fourth, and fifth identities.

In some implementations, the method further comprises: receiving, from the application module, a connection setup request for the connection between the application module and the first target device, the connection setup request including at least the first identity; obtaining a response to the connection setup request, the response including the fifth identity; and transmitting, to the application module, the response to the connection setup request.

In some implementations, the method further comprises: determining, based on the first and fourth identities, a routing path from the application module of the FPGA device to the first target device; and determining the first routing information indicating a part of the routing path within the FPGA device.

In some implementations, the method further comprises: transmitting, to a further device, further routing information indicating a remaining part of the routing path within the further device.

In some implementations, the method further comprises: scheduling, based on a predetermined scheduling policy, the physical interface to transmit a message from the first protocol stack module, the message being generated from the first data.

In some implementations, the FPGA device is included in a first computing device and the plurality of target devices are selected from a group consisting of: a further FPGA device, a processing device, or a storage device included in the first computing device; or an FPGA device, a processing device, or a storage device included in a remote second computing device.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. The machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A first field programmable gate array (FPGA) device comprising:
   a first protocol stack operable to:
      receive data from a second FPGA device;
   a universal access module operable to:
      receive the data and an identity of a target device from the first protocol stack, the target device being a destination for the data; and
   a second protocol stack operable to:
      receive the data from the universal access module; and
      transmit the data to the target device via a first physical interface of the first FPGA device based on a communication protocol.

2. The first FPGA device of claim 1, wherein the universal access module enables data switching between the first protocol stack and the second protocol stack by functioning as a relay between the first protocol stack and the second protocol stack.

3. The first FPGA device of claim 1, wherein the second FPGA is not directly connected to the target device.

4. The first FPGA device of claim 1, wherein the first protocol stack receives the data from second FPGA via the first physical interface.

5. The first FPGA device of claim 1, wherein the first protocol stack receives the data from second FPGA via a second interface.

6. The first FPGA device of claim 1, wherein the universal access module transmits the data to the second protocol stack based on the identity.

7. The first FPGA device of claim 6, wherein transmitting the data to the second protocol stack based on the identity comprises identifying routing information that indicates a mapping between the identity and the second protocol stack.

8. The first FPGA device of claim 7, wherein the routing information is preconfigured and is stored in the universal access module.

9. The first FPGA device of claim 7, wherein the routing information:
   is dynamically calculated by a separate device; and
   is provided to the universal access module by the separate device.

10. The first FPGA device of claim 1, wherein the target device:
    is accessible to the second protocol stack; and
    is not accessible to the first protocol stack.

11. The first FPGA device of claim 1, wherein the second FPGA provides the identity to the first protocol stack.

12. The first FPGA device of claim 1, further comprising an application, the universal access module serving as an interface between the application and both the first protocol stack and the second protocol stack.

13. The first FPGA device of claim 12, wherein the universal access module enables the application to transparently communicate with a plurality of target devices without the application having to determine whether the plurality of target devices is located remotely from a computing device comprising the first FPGA device.

14. A method comprising:
    receiving, by a universal access module of a first field programmable gate array (FPGA) device, data and an identity of a target device from a first protocol stack, the target device being a destination for the data; and
    transmitting, by the universal access module, the data to a second protocol stack of the first FPGA device based on the identity, the second protocol stack being operable to transmit the data to the target device via a first physical interface of the first FPGA device based on a communication protocol.

15. The method of claim 14, wherein the data is provided to the first protocol stack by a second FPGA device that is connected to the first FPGA device.

16. The method of claim 14, wherein the data is provided to the first protocol stack by a computing device that:
    is directly connected to the first FPGA device; and
    is not directly connected to the target device.

17. The method of claim 14, wherein transmitting the data to the second protocol stack based on the identity comprises identifying a mapping between the identity and the second protocol stack.

18. The method of claim 14, wherein the second protocol stack is operable to access a plurality of target devices based on different communication protocols via one or more physical interfaces of the first FPGA device, the target device being included in the plurality of target devices.

19. The method of claim 14, wherein the first protocol stack is operable to access a plurality of target devices based on different communication protocols via one or more physical interfaces of the first FPGA device, the target device not being included in the plurality of target devices.

20. A device comprising:
    a processing device; and
    a first field programmable gate array (FPGA) device communicatively coupled to the processing device, the first FPGA device comprising:
       a first protocol stack operable to:
          receive data from a second FPGA device;
       a universal access module operable to:
          receive the data and an identity of a target device from the first protocol stack, the target device being a destination for the data; and a second protocol stack operable to:
  receive the data from the universal access module; and
  transmit the data to the target device via a first physical interface of the first FPGA device based on a communication protocol.

* * * * *